United States Patent [19]

Nelson

[11] Patent Number: 4,539,786
[45] Date of Patent: Sep. 10, 1985

[54] BIAXIAL SCISSORS FOLD, POST TENSIONED STRUCTURE

[75] Inventor: Roy A. Nelson, Grand Prairie, Tex.

[73] Assignee: LTV Aerospace and Defense Co., Dallas, Tex.

[21] Appl. No.: 471,578

[22] Filed: Mar. 3, 1983

[51] Int. Cl.³ .......................................... E04H 12/18
[52] U.S. Cl. ...................................... 52/645; 52/113; 52/646; 52/DIG. 10
[58] Field of Search ................... 52/80, 108, 109, 110, 52/111, 113, 117, 118, 645, 648, DIG. 10, 646; 135/109

[56] References Cited

U.S. PATENT DOCUMENTS

| | | | |
|---|---|---|---|
| 1,947,647 | 2/1934 | Holden | 52/109 X |
| 3,427,769 | 2/1969 | Star | 52/108 X |
| 3,486,279 | 12/1969 | Webb | 52/108 |
| 3,771,274 | 11/1973 | Vaughan | 52/646 |
| 3,783,573 | 1/1974 | Vaughan | 52/646 |
| 4,017,932 | 4/1977 | Lotto et al. | 52/646 X |
| 4,259,825 | 4/1981 | Hedgepeth et al. | 52/645 |
| 4,276,726 | 7/1981 | Derus | 52/109 |
| 4,337,560 | 7/1982 | Slysh | 52/646 X |
| 4,393,887 | 7/1983 | Orobin | 52/645 X |
| 4,425,929 | 1/1984 | Von Mosshaim | 135/109 |

FOREIGN PATENT DOCUMENTS 2063959  6/1981  United Kingdom .................. 52/645

*Primary Examiner*—Donald G. Kelly
*Assistant Examiner*—Richard E. Chilcot, Jr.
*Attorney, Agent, or Firm*—James M. Cate; Thomas F. Daley

[57] ABSTRACT

A structure capable of being expanded and retracted. The structure includes a pair of cells each including a plurality of leg elements which are pivotally joined at one end to form an apex point and which are pivotally joined at their opposite ends from the apex point connection to the corresponding leg element from the other cell to form a plurality of common base points. The structure also includes a plurality of hinged elements connected between adjacent common base points to thereby form a common base and the hinged elements each have a pair of sections that are connected at a hinge point approximately midway between the adjacent common base points to which the other end of each section is connected. The structure further includes an actuator means having its ends pivotally attached to the apex points and a means associated with the actuator means for biasing the apex points to which the actuator means is attached towards and away from each other whereby the leg elements pivot about the apex points and the base points, the sections of the hinged elements pivot about the base points and the hinge points to thereby expand or retract the structure, respectively.

10 Claims, 8 Drawing Figures

BIAXIAL SCISSORS FOLD, POST TENSIONED STRUCTURE

TECHNICAL FIELD

The present invention relates to deployable three dimensionably reinforced structures, and more particularly to deployable structures of this type having a high volume compaction ratio and built upon a module of a single cell pair.

BACKGROUND ART

Expandable structures of a type similar to that of the present invention are not uncommon. Truss structures of various angular configurations have been deployed and used in a wide variety of construction projects and are particularly adapted to constructing large space structures, such as space stations and space satellites having a requirement for deployable elements. The basic object of such stuctures is to provide a means within the design of the structure to expand from a relatively small package to a relatively large structure. Typically the design includes a core element or cell of arms or links which can be used as the basic modular building block to construct expandable or deployable structures of varying shapes and sizes. The ultimate structure then is designed to be rapidly deployable into a rigid, usable construction structure and is to be equally rapidly retractable into a very small package relative to the structure available when fully deployed. In the past the truss structures that have been conventionally designed have been designed for limited or single purpose uses and have offered therefore little in the way of versatility and adaptiveness to a wider variety of construction or similar structural problems. In addition the conventional design has not always provided for a high compaction ratio above one in the order of 100 to 1 from deployed structure to retracted structure and hence the lower compaction ratio has limited the availability of such deployable structures to large structural uses. One typical expandable and retractable structure is described in U.S. Pat. No. 3,771,274 issued to Desmond H. Vaughan. The Vaughan patent describes a structure which comprises a first set of three rigid links connected by a first primary pivot point and a connected set of three rigid links connected at a second pivot point. The second set of links is joined to the first set of links by three secondary pivot points. To create or deploy the structure a set of three bracing cables is employed to connect between and to the three secondary pivots and thereby complete a double tetragonal structure. An actuator system is provided in the form of an extension cable 51 inside arm 52 which is designed to draw together the two primary pivot points, thereby rigidizing and stabilizing the basic cell and the deployed structured formed from a plurality of these basic cell forms. To collapse the structure the three bracing cables 10, 11, and 12 are drawn inwardly and the three pivot points are drawn together to collapse the structure into a very simple shape.

A similar structure is shown in the patent issued to Paul Slysh in U.S. Pat. No. 4,337,560 which describes a method for assembling large space structures. The space structure shown therein, comprises a plurality of trusses and truss junctions which in turn are made up of a plurality of individual struts and nodes. The basic cell structure formed by the assembly of struts and nodes is a three-dimensional element in which each end face is triangular and each of the three side faces is rectangular. The triangular structure employs arms 12 connected between two sets of three pivot points at each end face and each side is formed by additional arms 12 connected between each of the corresponding pivot points of the two sets. In addition, each of the side faces has an additional leg 12 diagonally disposed and connected between one pivot of each of the two sets of cells to act in bracing the structure. The Slysh patent however, is directed primarily to the method for assembling these structures using these types of cells and is not concerned generally with the particulars of a design for rapidly deploying or collapsing the resulting structure to a compact package, but rather has directed its inventive skill to the individual arms 12 and the adaptability of these arms to a variety of such structures built upon this particular triangular shaped cell.

One example of a design for only a single use in this art is that shown in U.S. Pat. No. 4,017,932 issued to S. Lotto, et al. The Lotto patent describes a temporary, modular, self erecting bridge which can be transported from place to place upon collapsing the side, top and bottom elements above respective pivot points. The expansion and contraction of these elements is effected by hydraulic jacks that are strategically positioned to draw in the several elements and cause the pivoting. The cell structure, however, is generally a simple triangular element with no bracing beyond that provided by the hydraulic jacks, and hence the design of any structure formed from this triangular shape relies on the placement of these hydraulic jacks.

Additionally, U.S. Pat. No. 4,276,726 issued to D. L. Derus, describes a collapsible, articulated wall structure which is formed from pivotally interconnected links. The basic structure is that of a three-dimensional rectangular or square cube formed from six pairs of crossed links that form each face of the cube and in which the individual links are connected from corner to corner and from pivot point to pivot point. The collapsible nature of the structure is effected by means of a single, fixed x-shaped element 70 which is designed to pivot inwardly after it is unlocked to allow the crossed links formed by link 70 to collapse downwardly as the respective pivot points to which they are attached are drawn in. The remaining sections draw into a fairly compact unit as shown in FIG. 4 of Derus.

The present invention comprises, as do most of the prior art devices, a plurality of legs or links interconnected between a plurality of pivot points. The present invention is unique however in that it uses a pyramidal shape pair of cells as the basic modular core for building upon, and in that it employs a diagonally-acting member to effect the tensioned or erected state and can be collapsed by the pivot arms of several of the links pulling in upon each other. In addition, the peculiar arrangement of the design enables it to achieve a normal contraction ratio in the order of 280 to 1, far greater than that achieved by designs shown and described in the prior art.

Accordingly, it is an object of the invention to provide a very high contraction-ratio structure that is employable in a variety of rapidly deployed and rapidly collapsed structures particularly for use in construction of structures, that serve a variety of purposes.

It is also an object of the present invention to provide for a structure that employs a pyramidal shaped cell as the basic modular core upon which the entire structure can be built.

It is another object of the present invention to provide for three varying types of legs or structure elements, one type being designed to carry the main structural load as required for the particular end use, another being employed to allow for an extremely high contraction ratio by having a pivot point along its length, and a third type employed to tension or contract the pyramidal shaped cell. In the deployed state, the diagonal actuation member, the third type employed therein, acts to strain the structural members, the joist type, in such a way that no compression load is sustained by the members having the articulated pivot joints, the second type.

It is a further object of the present invention to provide a structural deployment means which provides for the simultaneous activation and retraction of a plurality of diagonal actuation members for a plurality of modular, pyramidal shaped cells to form a rigid reinforced structure varying in size and complexity.

Equally, it is an object of the invention to provide a means for storage which only requires the simultaneous extension of the same diagonal actuation members to effectively retract the structure into an extremely compact state.

It is a further object of the present invention to facilitate both the deployment and retraction of the modular, pyramidal-shaped cells used in a structure through the use of a motorized cable reel assembly which is designed to manipulate the diagonal actuating members through a centralized point.

DISCLOSURE OF THE INVENTION

The present invention provides for a structure capable of being expanded and retracted. The structure includes a pair of cells and these cells each include a plurality of leg elements which are pivotally joined at one end to form an apex point and which are pivotally joined at their opposite ends from the apex point connection to the corresponding leg element from the other cell to form a plurality of common base points. The structure includes a plurality of hinged elements connected between adjacent common base points to thereby form a common base. These hinged elements each have a pair of sections that are connected at a hinge point approximately midway between the adjacent common base points to which the other end of each section is connected. The structure also includes an actuator means having its ends pivotally attached to the apex points and means associated with the actuator means for biasing the apex points to which the actuator means is attached towards and away from each other whereby the leg elements pivot about the apex points and the base points, the sections of the hinged elements pivot about the base points and the hinge points to thereby expand or retract the structure, respectively.

The invention further provides for a method for assembling a large structure formed from a plurality of smaller structures where each of said small structures is capable of being expanded and retracted such that said larger structure can be similarly expanded and retracted. The method includes longitudinally separating the smaller structures, simultaneously tensioning each of the smaller structures along this longitudinal direction of expansion sufficiently to ensure that the sections of the hinged elements have formed a continuous element and that the hinge points are no longer broken, simultaneously activating the actuator means for each of the smaller structures to bias the ends of the actuator means inwardly towards each other to thereby bias the apex points towards one another; and adjusting and locking the actuator means to ensure that the inwardly directed bias is maintained on each of the individual smaller structures.

BRIEF DESCRIPTION OF THE DRAWINGS

Further objects and advantages of the invention will become apparent from the following description and claims, and from the accompanying drawings, wherein:

DETAILED DESCRIPTION OF THE INVENTION

Figure 1:
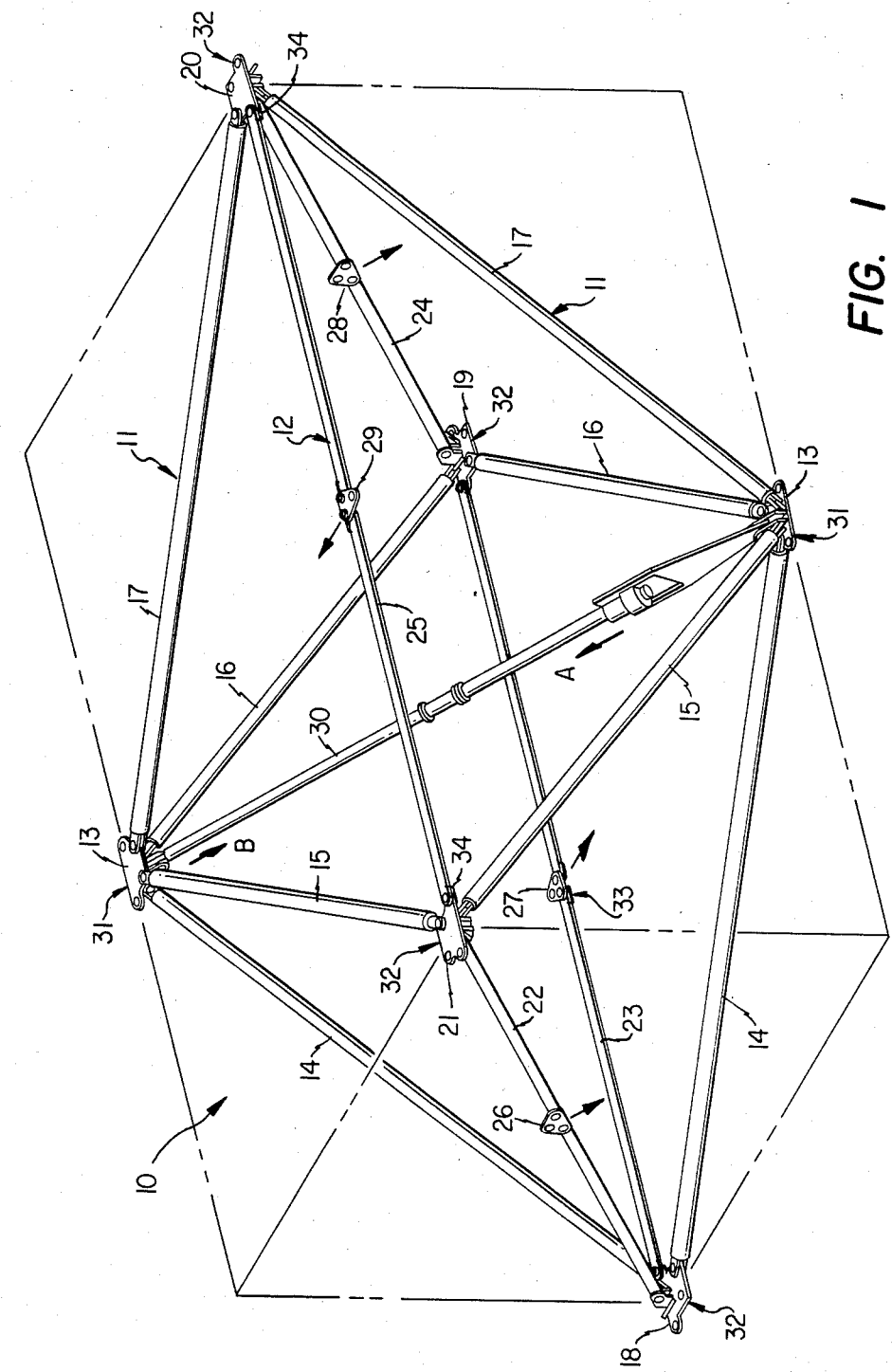
FIG. 1 is a perspective view of one embodiment of the present invention in which the basic cell of the present invention is shown to include a pair of pyramidal-shaped subcells positioned end-to-end and having a common base, each subcell includes four structural elements and with the common base having four hinged structural elements, and then a third type of element, the actuation member, employed for retracting and deploying the basic cell.

Referring now to the drawings in detail wherein like numerals indicate like elements throughout the several views, the present invention is shown in one particular embodiment although there are a number of other potential embodiments that could be employed by one of ordinary skill in accordance with the principals of the present invention.

Referring to FIG. 1, there is shown in perspective a basic cellular unit 10 of the present invention. This cellular unit comprises two pyramidal structures 11 which are connected by a common base section 12. This unit 10 is the minimum structure which can be supported in the biaxial scissors fold embodiment of the present invention. Each of the pyramidal structures 11 include four leg elements 14, 15, 16, 17 joined at one of the two apex points 13 of basic unit 10. Leg elements 14, 15, 16, 17 extend downwardly and outwardly from apex 13 toward the four corners of common base 12. The structural elements, i.e. legs 14, 15, 16 and 17 of both structures 11 of basic cell 10 are joined at common base points 18, 19, 20, 21 which base points form the corners of common base 12. In addition common base 12 is composed of hinged elements 22, 23, 24, 25 having the hinge points 26, 27, 28, 29, respectively, at approximately their mid-point, and each hinged element 22, 23, 24, 25 is joined between two adjacent common base points 18, 19, 20, 21 such that together they define common base 12 at the plane of basic cell unit 10 defining the base of two mirror-image pyramids, structures 11. For each pair of structures 11 thus formed there is a diagonally disposed member 30 connecting between the two apex points 13 of structures 11, which is adapted to act as an actuator and hold structure 10 in a deployed state, as shown by applying a force inwardly as per arrows A and B. The structural or leg elements 14, 15, 16, 17 which are all similar in design and concept may be of differing lengths depending on the particular sub-cell structure that is being designed.

Figure 2:
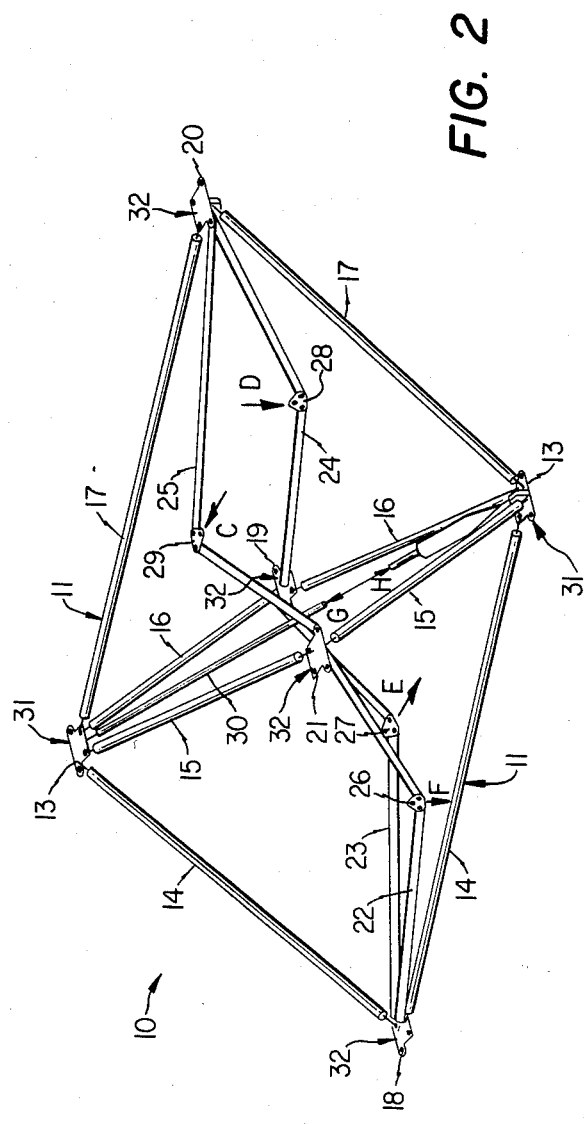
FIG. 2 shows the same basic cell unit shown in FIG. 1 in a partially broken down position, and includes arrows showing the direction of movement of the varying elements as they collapse from the deployed state of FIG. 1 to the compact, retracted state.

The real facility of this design of the present invention is best shown in FIG. 2 where the basic cell structure 10, including the two sub-structures 11, is shown as it is being retracted from a deployed state, e.g., as shown in FIG. 1, into its most compact shape by means of directional arrows C, D, E and F. As is indicated with respect to FIG. 1, when an actuator member 30 is positioned to deploy their respective basic cells, the actuator 30 is individually applying a force inwardly from the two apex points 13 of sub-structures 11 to which it is connected. As basic cell 10 is retracted, as shown in FIG. 2, actuator member 30 applies a force outwardly against the apex points 13 of sub-cell 11 as shown by directional arrows G and H. As this actuator force continues, hinged elements 22, 23, 24 and 25 which are connected and joined at adjacent base points 18, 19, 20, 21 are forced to break at hinge points 26, 27, 28 and 29, respectively, and, once broken, the two sections of each hinged element 22, 23, 24, 25 pivot in opposite directions, as shown by arrows C, D, E and F in FIG. 2, to allow the remaining structural elements in the two sub-structures 11 to pivot such that they come together and lay flat.

Figure 6:
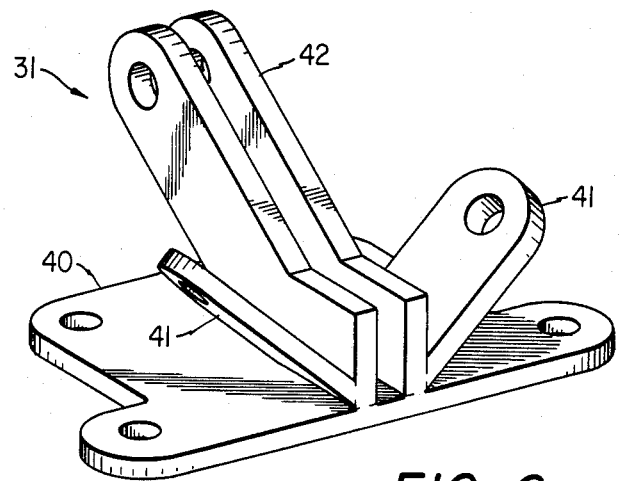
FIG. 6 shows a typical pivot point member used for the present invention at apex points to which the actuation member is connected.
Figure 7:
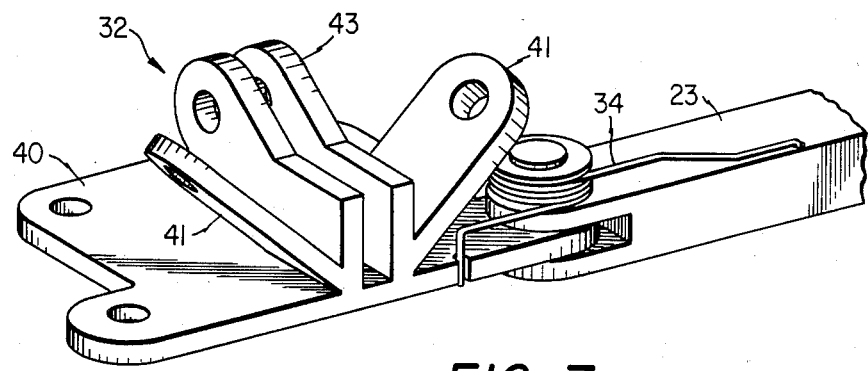
FIG. 7 shows a typical pivot point member used in the basic cell at the four pivot points of the common base as shown in the embodiment of a pyramidal-shaped cell in FIG. 1.

In order to enable the typical structure that is designed and built from a plurality of the basic cellular units 10 to retract as per FIG. 2, the design uses two different types of pivot points. A first pivot element 31 is used at apex 13 of each of the two sub-structures and all four of the structural elements 14, 15, 16, and 17 which comprise each sub-cell's pyramidal shape are connected hereto. The other pivot element 32 is used at common base points 18, 19, 20 and 21 in the common base 12 formed in conjunction with hinged elements 22, 23, 24 and 25. The two different pivot elements 31 and 32 are shown in FIGS. 6 and 7, respectively, in more detail and as shown, can comprise a variety of connector means and are adaptable with simple modifications for connecting a variety of differently sized and shaped structural elements in order to accommodate a wide variety of structural designs and end uses as may be necessary to accommodate particular structures. In the particular embodiment of FIG. 1, pivot elements 31 and 32 include means for assisting in pivoting hinged elements 22, 23, 24 and 25, e.g. springs 34, and structural elements 14, 15, 16 and 17 and actuator member 30, e.g. spring 33. In the embodiments shown in FIGS. 1 and 2, apex points 13 are shown to include the junction of structural elements 14, 15, 16, and 17 employed in both sub-cells 11 of basic cell unit 10 and one end of actuator unit 30, and the base points 18, 19, 20, and 21 are shown to include a provision for connecting two of the structural members 14, 15, 16, and 17 and two of the hinged elements 22, 23, 24, and 25. It should be noted that this particular arrangement is employed in this embodiment to allow the actuator member 30 to effect the deployment and retraction of the basic modular cell structure. Hinged elements 22, 23, 24, and 25 need to be generally positioned in a single plane when unit 10 is deployed, and perpendicular to pivot points 13 to which actuator member 30 is connected to thereby allow the force that is transmitted integrally against apex points 13 and then against all of the pivot points when the retraction is occurring, to cause hinge points 26, 27, 28 and 29 to break and thereby allow the two parts of each of hinged elements 22, 23, 24 and 25 to pivot freely about one of the pivot elements 32 and the particular hinge points 26, 27, 28 and 29.

Figure 3:
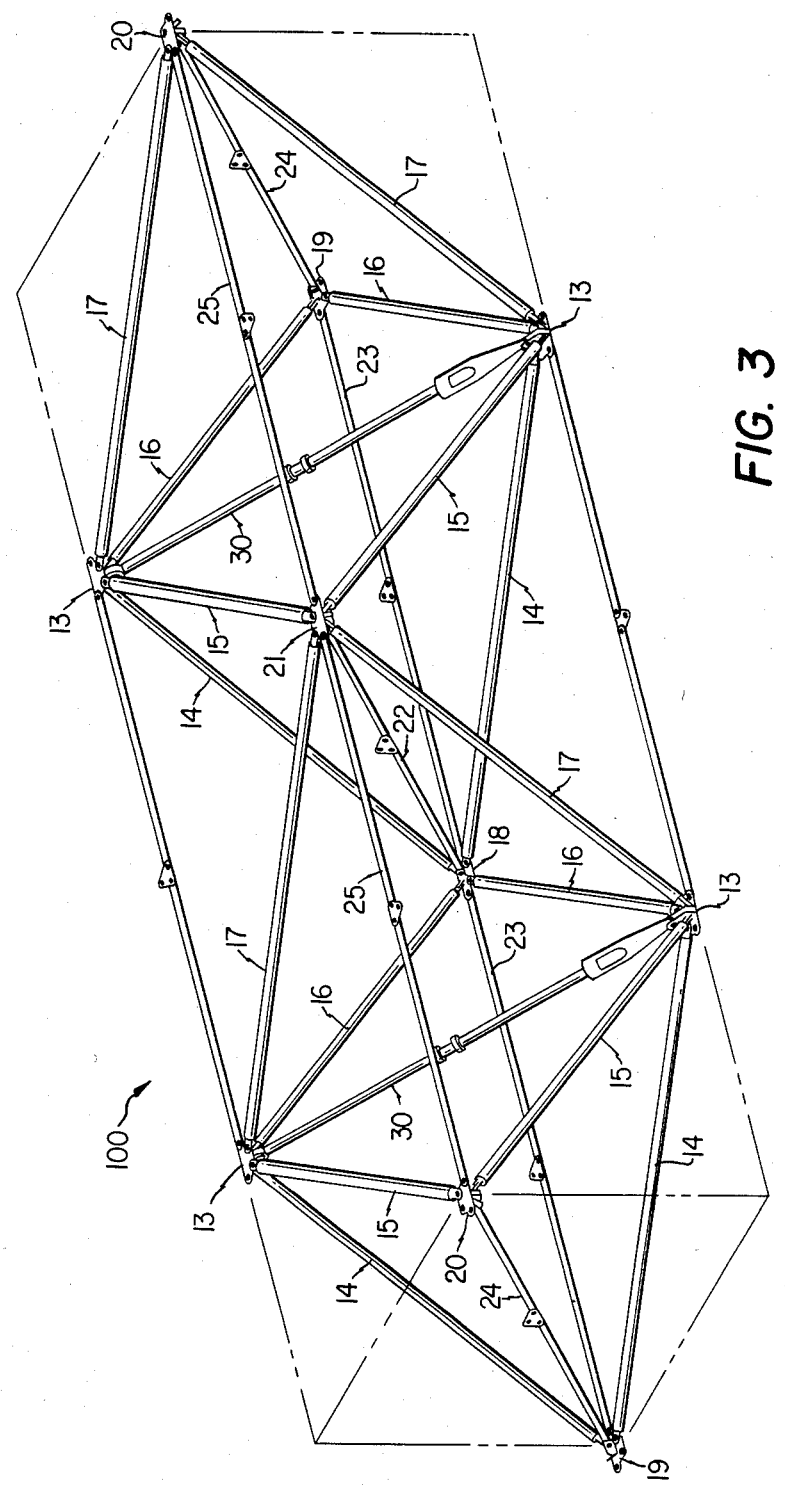
FIG. 3 shows the potential for designing large and complex structures employing the basic cell unit shown in FIG. 1 and FIG. 2, by showing, in perspective, a design that includes several of the basic cells of FIG. 1 to form a larger structure.

Referring now to FIG. 3, there is shown a structure builtup of a plurality of the basic cellular structure 10 of the present invention into a larger structure 100 as might be envisioned in employing this type of device. It should be noted that the adjoining modular cells 10 are similarly aligned with respect to each other to thereby allow each of the actuator members to be disposed for operation in the same general direction. This enables an operator to employ a means that can be remote from structure 100 when that structure is to be deployed or stowed to effect actuation or retraction of actuator member 30 and hence facilitate deployment of a rapid retraction and stowage of structure 100.

Figure 5:
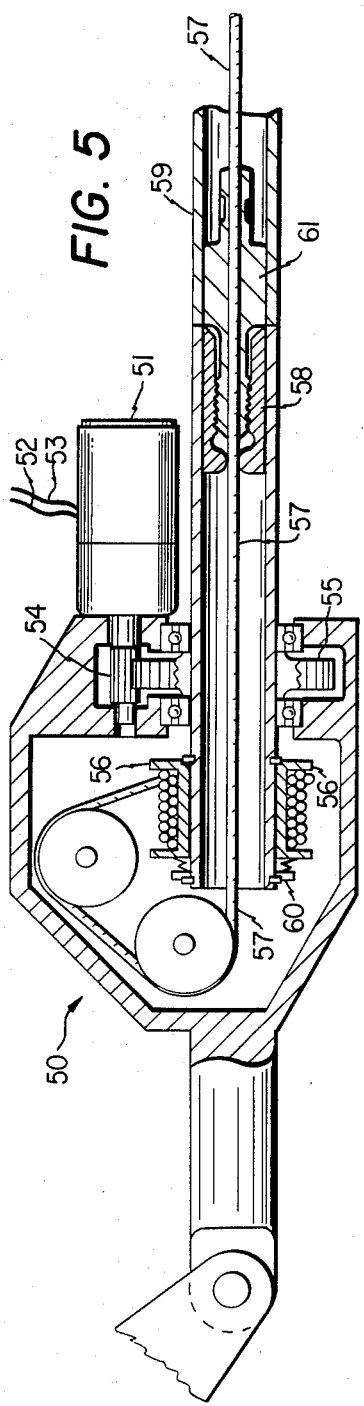
FIG. 5 shows the design for a typical actuator member for deploying and retracting the several elements that comprise a basic cell.

In FIG. 5 there is shown a motorized cable reel 50 that has been employed in conjunction with the present invention as one embodiment of a remotely located means for deploying or retracting a structure, such as structure 100 of FIG. 3, that is comprised of a plurality of modular cells 10. It should be noted however that there are a variety of similar and equivalent devices or means that are functionally capable of simultaneously drawing in or releasing cabling from a plurality of actuator members 30 and that can be readily employed by one of ordinary skill in the art in conjunction with structures designed and fabricated in accordance with the teaching of the present invention. The motorized cable reel 50 shown in FIG. 5 includes a motor 51, which upon application of a twenty-four (24) volt current to power wires 52 and 53, causes pinion gear 54 to drive gear assembly 55 to cause rotation of cable reel 56 which winds deploy cable 57. The winding of cable 57 causes actuating member 30 to compress inwardly from apex point 13 in the direction of arrows A and B of FIG. 1 and effect deployment of the particular structure, e.g. 10 or 100. When deployment is completed, a post-tension nut 58 will be guided by deployed cable 57 to engage the threaded end of tension strut 59. The cable reel slip clutch 60 is provided to limit cable tension, thus providing constant acceleration to the structure, e.g. 10 or 100, during deployment. Clutch 60 also permits a slowing down of the winding of deployed cable 57 when post-tensioned nut 58 is being screwed onto the end of tension strut 59. At a predetermined tension post-tension nut 58 contacts a stop 61 which stalls motor 51. When the motor 51 is de-energized, power wires 52 and 53 are shorted together so that no stray electricity can inadvertently energize actuator motor 51 when the structure, e.g. 10 or 100, is stored and not in use.

To stow the structure, e.g. 10 or 100, motor 51 is energized as before with twenty-four (24) volt DC current, except that in this mode polarity is reversed to thereby reverse the direction of turn of motor 51. This causes the deployed structure, e.g. 10 or 100, and its actuators 30 to operate in reverse. The post-tensioned nut 58 backs off the threaded end of tensioned strut 59 as the cable reel 56 unwinds and provides slack in the deploy cable 57. To facilitate this process, knee joint buckling springs 33 are located in the mid-section hinges of hinged members 22, 23, 24 and 25, which are flat in the embodiment shown to accommodate the use of springs 33, and which are joined at base points 18, 19, 20 and 21 of the sub-cells 11. These knee buckling springs 33 will assist hinged elements 22, 23, 24 and 25 in folding inwardly, as shown by the arrows in FIG. 2. Similarly, linear refold spring 34 are attached to pivot points 32 for the structural elements 14, 15, 16 and 17 and the ends of hinged elements 22, 23, 24 and 25 to assist in retracting the structure to the stowed position. Once the structure has achieved approximately one half of the fold travel, as shown generally in FIG. 2, each actuator motor 51 is de-energized and its power wires 52, 53 are shorted together, acting as a resistor to cause actuator motor 51 to act as a generator and thus slow the full refolding velocity. The mechanical advantage of the refold actuator 30 to the refold springs 34 reduces as the fold stops 61 are approached, but the force of the refold springs 34 approaches zero as the fold stops 61 are encountered so that the folding of the structure is completed in a relatively smooth and steady manner.

Figure 4A:
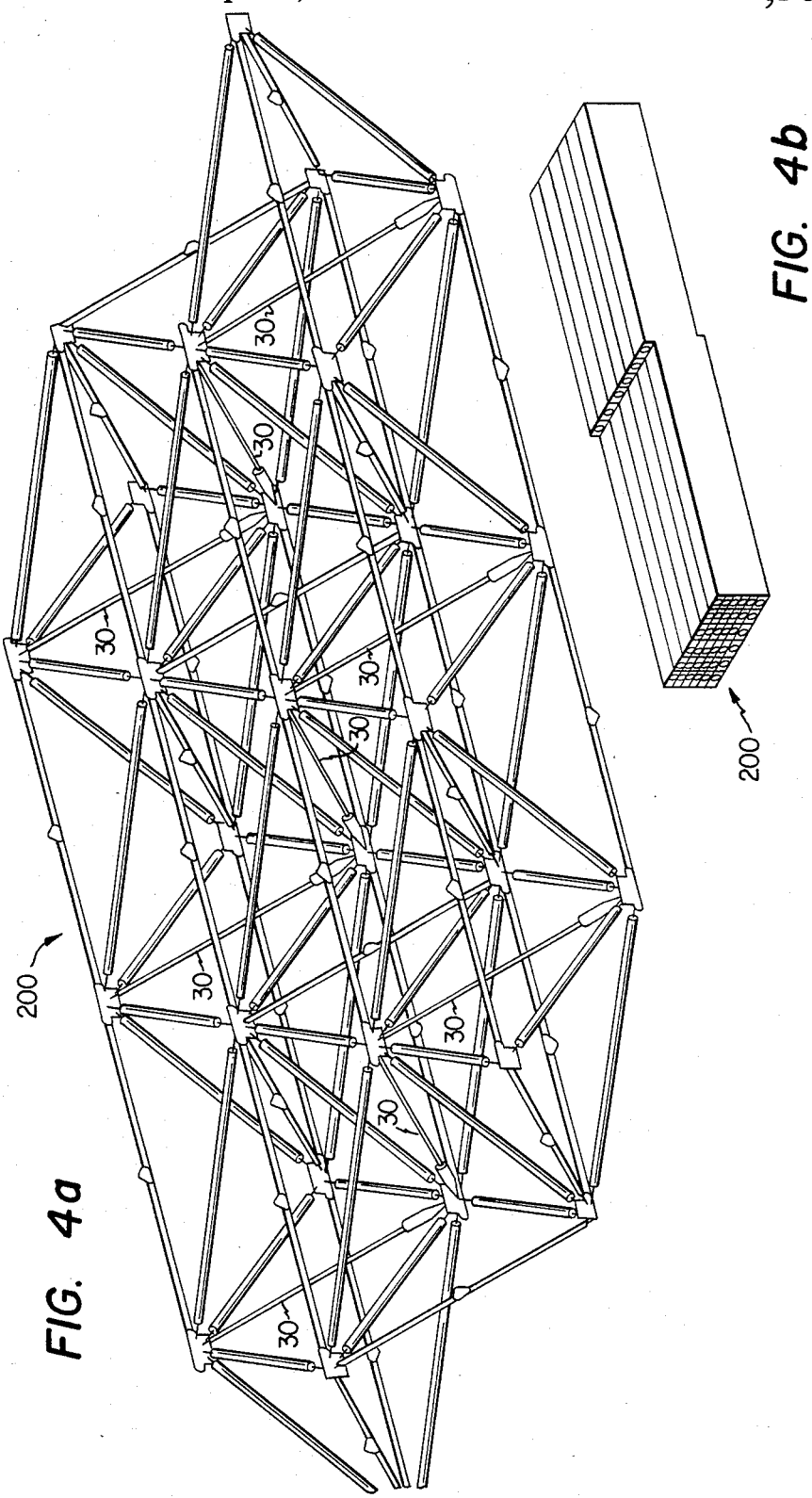
FIG. 4A is a further perspective view showing an even larger structure than that of FIG. 3 following the same principals employed in combining the basic cells of FIG. 1 and FIG. 2, as shown in FIG. 3.
Figure 4B:
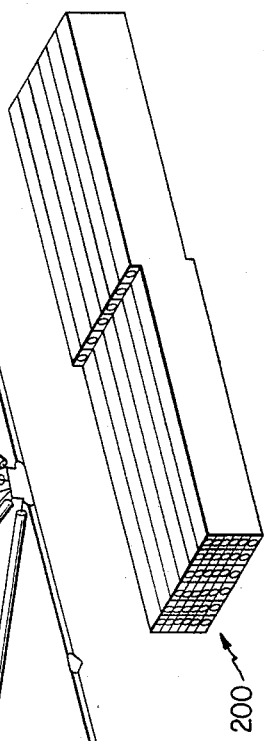
FIG. 4B shows the structure of FIG. 4A in a retracted and compacted state.

Referring now to FIG. 4 there is shown a larger structure 200 than that of either FIGS. 1, 2, or 3 which employs the basic modular cell structure 10, shown in FIGS. 1 and 2,. This larger structure 200 employs the basic cell 10 of FIG. 1 as it fits into the enlarged structure 200 of FIG. 4A. FIG. 4B shows the identical structural 200 of FIG. 4A in the stowed position, i.e. after retraction has occurred as generally described in relation to FIG. 2. This stowed structure can therefore be visually compared to the structure of FIG. 4A to realize the extremely high volume compaction ratio that the present invention provides by its unique design. With larger devices and structures, especially those for use in land-based operations, deployment of a particular strucure, e.g. 10, 100, 200 may preferrably be manually performed in order to avoid the potentially high cost and increased weight which the actuating system, as including motor 51 shown in FIG. 5 and actuation member 30, when designed to provide this automatic means for deploying or retraction. However, in the event that manual deployment is not preferred, the drawing of FIG. 4A is shown to include a complete remote actuating system, e.g. actuation member 30, with motors 51 not shown and being positioned at a remote site, in order to allow a visual comparison of the position of this actuating system. However, in the event that it was preferred to manually deploy the stowed structure of FIG. 4B, the structure would preferably first be stretched longitudinally to generally extend the folded members into a continuous element. With a large structure, as is shown generally in FIG. 4, this would be accomplished by keeping one end of stowed structure 200 stationary while towing the other end with some vehicle or similar device. Once structure 200 is extended, diagonal actuating members 30 can be tightened manually to provide the necessary tension. These members may be, for example, tension cables having a toggle lock or a similar device on one end. Tightening all of these actuators 30 would result in the desired rigid reinforced structure.

FIGS. 6 and 7, show the particular pivot elements 31 and 32 as employed in the cell 10 of the present invention in some detail. It should be noted that by employing structural members 14, 15, 16 and 17 which are shown in FIGS. 1 and 2 in a particular configuration relative to the base and relative to each other that the pivot elements 32 of base points 18, 19, 20 and 21 need only be designed to sustain certain tensional loads and need not be of substantial structural locking strength. FIGS. 6 and 7 show only typical pivot elements that can be employed in the pyramidal sub-cells 11 at either the apex 13 or the common base points 18, 19, 20 and 21. The design can be readily modified to provide sufficient structural restraints for any construction or utility need.

It should be noted that when the structure is deployed, the sub-cells 11 and the several structural elements will generally taken on particular geometric relationships with regard to one another in order to take advantage of the symmetry for stowage. In the particular embodiment shown in FIGS. 1 and 2, structural elements 15 and 16 of the sub-cells are positioned such that each corner is disposed at 90 degrees or such that they form a squared section. Similarly, hinged members 22, 23, 24 and 25 are positioned such that one of the hinged arms is positioned 90 degrees to its adjacent base structural element and the other is positioned at 45 degrees to its adjacent base structural elements. This peculiar arrangement provides a degree of structural integrity to the cell 10 and the two sub-cells 11 are mirror images of each other. The pivot elements 31 and 32 shown in FIGS. 6 and 7 can therefore be generally quite similar in design and in arrangement. The differences are usually in the length and direction of certain connection points where the several elements of the sub-cells 11 are attached thereto. In the particular embodiment shown in FIGS. 6 and 7, each of pivot points 31 and 32 include several connecting points on base 40 and additional connecting pivots on angled connecting arms 41 and 42.

Pivot point 31 of FIG. 6 has a large connecting arm 42 than that of pivot 32 of FIG. 7 in order to accommodate the force transmitted by actuator element 30.

The above described modular cell structure and the related uses in which the cell 10 can be employed as shown in FIGS. 3 and 4, is but one embodiment of a use for the present invention. Various improvements, modifications and alternative applications and uses will be readily apparent to those ordinarily skilled in the art. Accordingly, the scope of the present invention should be considered in terms of the following claims and it is not to be limited to the details of the embodiment of the structure and operation shown in this specification and drawings.

I claim:
1. A structure capable of being expanded and retracted comprising:
 (a) a pair of cells;
 (b) said cells each including a plurality of leg elements which are pivotally joined at one end to form an apex point and which are pivotally joined at their ends opposite from the apex point connection, to the corresponding leg element from said other cell to form a plurality of common base points, said leg elements comprising means for sustaining compressive loads;

(c) a plurality of tensional, hinged, elements connected between adjacent common base points to thereby form a common base;

(d) said hinged elements each having a pair of sections that are connected at a hinge point approximately midway between said adjacent common base points to which said other end of each section is connected, said hinged elements comprising means for forming a linear configuration sustaining tensional loads and for folding into a compacted configuration upon the application of compressive loads;

(e) an actuator means having its ends pivotally attached to said apex points; and (f) biasing means associated with said actuator means for biasing said apex points, to which said actuator means is attached, towards and away from each other whereby said leg elements pivot about said apex points and said base points, said sections of said hinged elements pivot about said base points and said hinge points to thereby expand or retract said structure, respectively;

(g) wherein said actuator means further comprises means for expanding said structure from a compacted to an expanded configuration by drawing said apex points toward each other and for applying compressive loads upon said leg elements for displaying said ends of said leg elements opposite said apex points mutually outwardly against constraining, tensional forces exerted by said hinged elements.

2. The structure of claim 1 wherein a plurality of said structures oriented in a substantially similar manner are connected together to form a larger structure that is capable of being expanded and retracted in a similar manner to said structure.

3. The structure of claim 1 wherein siad cells each include four leg elements and four hinged elements such that said cells are generally pyramidal in shape and are generally mirror images of each other.

4. The structure of claim 1 wherein said actuator means includes a capable means for connecting said apex points, a motor driven cable reel system capable of winding said cable means to inwardly bias said apex points for erecting said structure, and a plurality of spring elements that are adapted to cause said leg elements to exert an outward bias against said apex points to cause said structure to retract.

5. A method for assembling a large structure formed from a plurality of smaller structures where each of said smaller structures includes a pair of cells each having a plurality of leg elements that are pivotally joined at one end to form an apex point and which are pivotally joined at their opposite ends to the corresponding leg element from said other cell to form a plurality of common base points, a plurality of hinged elements connected between adjacent common base points to thereby form a common base where said hinged elements each have a pair of sections that are connected at a hinge point approximately midway between said adjacent common base points to which said other end of each section is connected, an actuator means having its end pivotally attached to said apex points, and means associated with said actuator means for biasing said apex points to which said actuator means is attached towards and away from each other whereby said leg elements pivot about said apex points and base points, said sections of said hinged elements pivot about said base points and said hinge points to thereby expand or retract said structure, respectively, and that is capable of being expanded and retracted such that said larger structure can be similarly expanded and retracted, comprising:

(a) longitudinally separating said smaller structures;

(b) simultaneously tensioning each of said smaller structures along this longitudinal direction of expansion sufficiently to ensure that said sections of said hinged elements have formed a continuous element and that said hinge points are no longer broken;

(c) simultaneously activating said actuator means for each of said smaller structures to bias the ends of said actuator means inwardly towards each other to thereby bias said apex points towards one another; and (d) adjusting and locking said actuator means to ensure that the inwardly directed bias is maintained on each of said individual smaller structures.

6. A deployable structure capable of being expanded and contracted, comprising:

(a) a pair of cells each including a plurality of leg elements pivotally joined at one end to form an apex and pivotally joined at their opposite ends to a corresponding leg element from said other cell to form a plurality of common base points, the leg elements comprising means for sustaining compressive loads, (b) a plurality of tension structures each connected between a respective pair of adjacent common base points to thereby form a common base, said tensional structures comprising means for sustaining tensional loads, forming a substantially linear configuration under tensional loads, and adapted to collapse into a non-linear configuration upon the application of compressive loads;

(c) actuating means connected between said apex points for drawing said apex points toward each other and for applying compressive forces upon said leg elements for urging said leg elements outwardly, thereby applying tensional forces to said tensional structures.

7. The apparatus of claim 6, wherein said tensional structures comprise foldable, hinged elements connected between adjacent common base points to thereby form a common base, each having a pair of sections connected at a hinge point approximately midway between said common base points.

8. The apparatus of claim 6, wherein said plurality of leg elements of each cell comprise four rigid, elongated members, and wherein said cells comprise respective pyramidal structures upon deployment.

9. The apparatus of claim 6, wherein said actuator means connected between said apex points comprises actuator means for applying tensional forces for drawing said apex points toward each other, for deploying and maintaining deployment of said deployable structure, and for releasing said tensional forces for compaction of said deployable structure.

10. The apparatus of claim 6, wherein said means connected between said apex points further comprises means for urging said apex points in mutually opposite directions for compaction of said deployable structure.

* * * * *